United States Patent [19]

Kuo et al.

[11] Patent Number: 6,105,079
[45] Date of Patent: Aug. 15, 2000

[54] APPARATUS AND METHOD IN A NETWORK INTERFACE DEVICE FOR SELECTIVELY SUPPLYING LONG BIT INFORMATION RELATED TO A DATA FRAME TO A BUFFER MEMORY AND A READ CONTROLLER FOR INITIATION OF DATA TRANSFERS

[75] Inventors: Jerry Chun-Jen Kuo; Po-Shen Lai, both of San Jose; Autumn Jane Niu, Sunnyvale, all of Calif.

[73] Assignee: Advanced Micro Devices, Inc., Sunnyvale, Calif.

[21] Appl. No.: 08/993,058

[22] Filed: Dec. 18, 1997

[51] Int. Cl.$^7$ ............................. G06F 13/14; G06F 13/24; G06F 13/28
[52] U.S. Cl. ............................. 710/25; 710/21; 710/23; 710/33; 710/48
[58] Field of Search ............................. 710/22, 23, 28, 710/52, 25, 21, 33, 48; 709/234

[56] References Cited

U.S. PATENT DOCUMENTS

| | | | |
|---|---|---|---|
| 5,210,749 | 5/1993 | Firoozmand | 370/463 |
| 5,319,752 | 6/1994 | Petersen et al. | 709/234 |
| 5,426,756 | 6/1995 | Shyi et al. | 711/159 |
| 5,485,584 | 1/1996 | Hausman et al. | 710/21 |
| 5,555,524 | 9/1996 | Castellano | 365/221 |
| 5,761,453 | 6/1998 | Anderson et al. | 710/126 |
| 5,822,618 | 10/1998 | Ecclesine | 710/57 |

FOREIGN PATENT DOCUMENTS

409288631A   11/1997   Japan .

*Primary Examiner*—Thomas C. Lee
*Assistant Examiner*—Ilwoo Park

[57] ABSTRACT

A network interface device minimizes access latency in initiating a DMA transfer request by selectively supplying a long bit comparison result, generated in a write controller configured for writing data into a buffer memory, directly to a read controller based on a determination that the buffer memory stores less than one complete frame. The media access controller determines the length of the data frame, and supplies the determined length to the write controller. The write controller compares the determined length to a prescribed threshold, and outputs a long bit value for storage in a buffer memory location contiguous with the stored data frame. The long bit can then be used to select a receive buffer threshold optimized for larger frames. If less than one complete frame is stored in the buffer memory, the write controller outputs the long bit information to the read controller, enabling the read controller to initiate a DMA transfer request, using a threshold selected based on the long-bit information, prior to storage of the complete data frame in the buffer memory.

20 Claims, 6 Drawing Sheets

APPARATUS AND METHOD IN A NETWORK INTERFACE DEVICE FOR SELECTIVELY SUPPLYING LONG BIT INFORMATION RELATED TO A DATA FRAME TO A BUFFER MEMORY AND A READ CONTROLLER FOR INITIATION OF DATA TRANSFERS

TECHNICAL FIELD

The present invention relates to network interfacing and more particularly, to methods and systems for buffering data between a host bus interface and a media access controller accessing Ethernet media.

BACKGROUND ART

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by a media access controller (MAC), and receive data is stored in a receive FIFO by the MAC prior to transfer to the host computer via the host computer bus interface.

One disadvantage with the use of a FIFO for a transmit buffer or a receive buffer is the increased latency encountered during the buffering process. The latency of the network interface device is the time delay between the time that a data frame is supplied to the network interface device and the time the data is transmitted on the network media, or vice versa.

An additional disadvantage with the use of a FIFO for transmit buffer or receive buffer is the increasing complexity associated with maintaining status information for each data frame stored in the FIFO buffer. If a stored data frame is to have corresponding status information, then an additional FIFO buffer would be required for storing the status information for each stored data frame. Hence, a transmit buffer may require a frame data FIFO for the actual frame data, and a status FIFO for storing the corresponding status information for each data frame. Such an arrangement would result in a substantial increase in the amount of area required on a chip for the status FIFO. In addition, additional synchronization logic would be required to maintain correspondence between the stored frame data and the corresponding status data, increasing the cost and complexity of the network interface device.

In addition, it is desirable to minimize latency in the network interface device by beginning transfer of stored data from a receive FIFO to the host computer as soon as possible. In cases where a received data frame has a length substantially greater than the minimum IEEE 802.3 packet length of 64 bytes, it may be desirable to begin transfer before the entire data frame has been written into the receive FIFO. However, supplying length information from the MAC to both a write controller (responsible for writing the data frame into the receive FIFO) and a read controller (responsible for reading the data frame from the receive FIFO) may increase the interconnect or pin count of the associated devices, increasing the cost and complexity of the network interface device. In addition, the storage of the length field as status information in the status FIFO would not only increase the cost and complexity of the network interface device, but would also increase the latency by requiring the status information to pass through the status FIFO before the read controller could determine the presence of a long frame.

DISCLOSURE OF THE INVENTION

There is a need for an arrangement that enables use of random access memory in a network controller, as opposed to a FIFO buffer, to store both a data frame and corresponding tracking information indicating the status of the stored data frame, while minimizing the latency independent of the length of received data frames.

There is also a need for an arrangement in a network interface device that enables a read controller to read data from a buffer memory onto a host bus with minimal latency and minimal complexity in the network interface device design.

There is also a need for an arrangement in a network interface device that enables long frame comparison results, generated in a write controller operating in a network clock domain, to be shared with a read controller operating in a host bus clock domain, independent of the respective clock domains.

There is also a need for an arrangement enabling a read controller to initiate a DMA interrupt request prior to storage of a complete data frame in a buffer memory based on length results received from a write controller. For example, there is a need for an arrangement that enables a read controller to select a buffer threshold for the DMA interrupt request based on the length results received from the write controller, and before the complete data frame has been stored in buffer memory.

These and other needs are attained by the present invention, where a write controller configured for storing a data frame into a buffer memory based on a network clock domain generates a long bit comparison for the corresponding data frame, and selectively supplies the long bit comparison to a second memory controller based on a detected absence of a complete stored data frame in the buffer memory.

According to one aspect of the present invention, a method in a network interface device comprises determining in a media access controller a length of a data frame received from a network, selectively generating a long bit comparison result in a first memory controller based on the length of the data frame exceeding a prescribed threshold, the first memory controller configured for storing the data frame into the buffer memory based on a network clock domain, and selectively supplying the long bit comparison result to at least one of a second memory controller, configured for reading the data frame from the buffer memory onto a host bus based on a host bus clock domain, and a memory location in the buffer memory reserved for storing status information related to the data frame, based on a detected presence of at least one complete stored data frame in the buffer memory. Supplying the long bit comparison result to the buffer memory enables the long bit information to be shared between the memory controllers operating in different clock domains, minimizing the interconnect and/or pin count of the network interface device. Moreover, the selective supply of the long bit comparison results directly to the second memory controller enables the second memory controller to generate a host bus transfer interrupt based on an appropriate threshold for the length of the received data packet. Hence, a host bus transfer request can be initiated in an efficient manner that reduces latency, without increasing the complexity of the network interface device.

Another aspect of the present invention provides a network interface device for storing a data frame, comprising a media access controller for receiving the data frame based on a network clock, the media access controller determining a length of the data frame based on a first portion of the data frame, a random access memory, a read controller configured for reading data from the buffer memory onto a host bus based on a host bus clock, and a write controller configured for writing the data frame into the random access memory at a prescribed location according to the network clock, the write controller comparing the determined length of the data frame to a prescribed threshold and selectively outputting a corresponding long bit comparison result to at least one of the random access memory and the read controller based on a detected presence of at least one complete stored data frame in the random access memory. The selective output of the long bit comparison result to the read controller enables the read controller to initiate a host bus transfer interrupt in response to reception of the long bit comparison result. Hence, a read controller, upon receiving the long bit comparison result, may initiate a host bus transfer interrupt for the corresponding data frame based on an appropriate threshold for the length of the received data packet, even though less than one complete frame has been stored in the random access memory.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface device in a packet switched network, such as an Ethernet (IEEE 802.3) network. The description will first be given of the network interface device architecture, followed by the arrangement for selectively outputting a long bit comparison result to a read controller based on a detected presence of at least one complete stored data frame in the random access memory. It will become apparent, however, that the present invention is also applicable to other network interface device systems.

Network Interface Device Architecture

Figures 1, 1A:
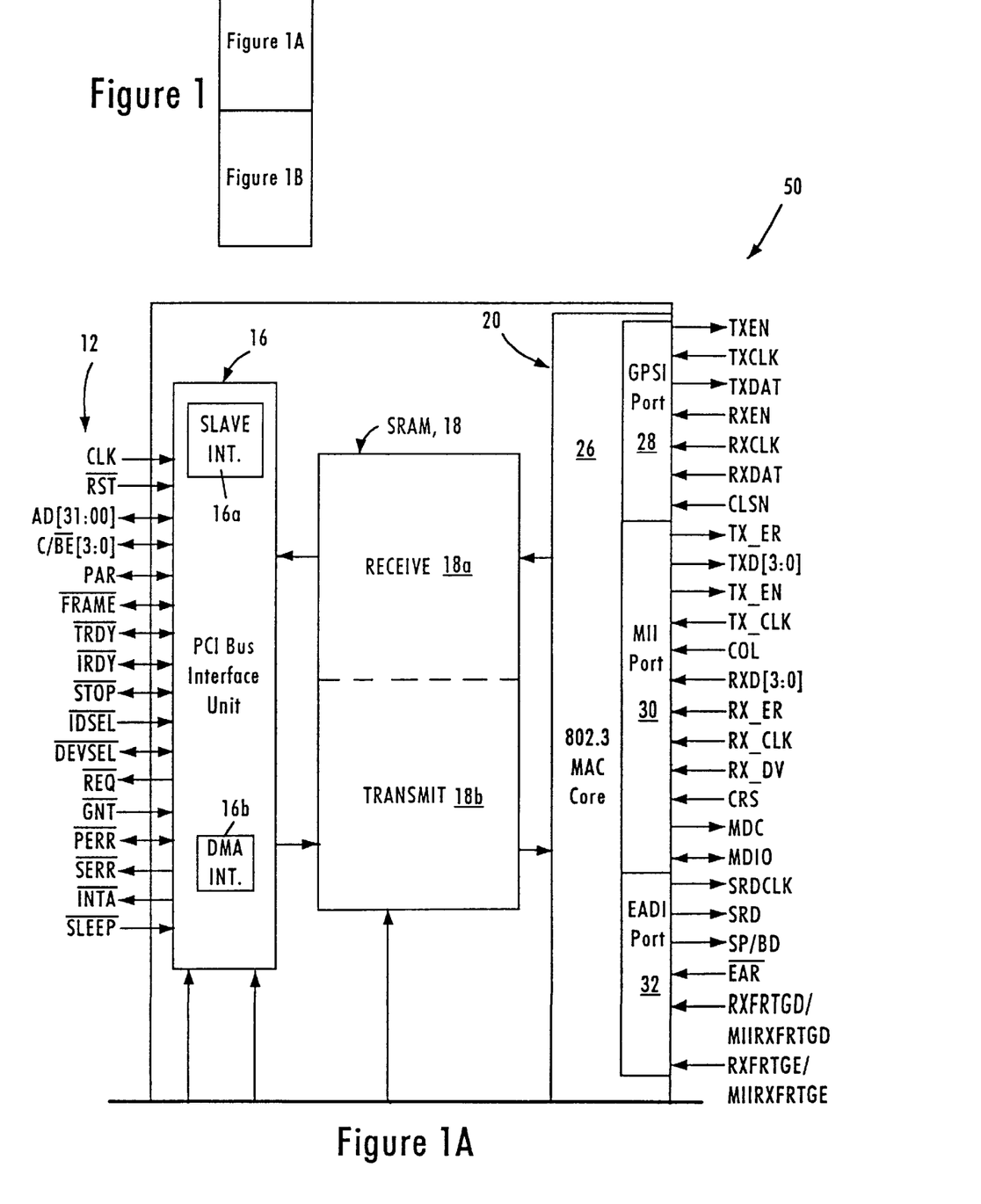
FIGS. 1, 1A and 1B are block diagrams illustrating an exemplary network interface device having a memory controller for writing a data frame and corresponding tracking information into a random access memory according to an embodiment of the present invention.
Figure 1B:
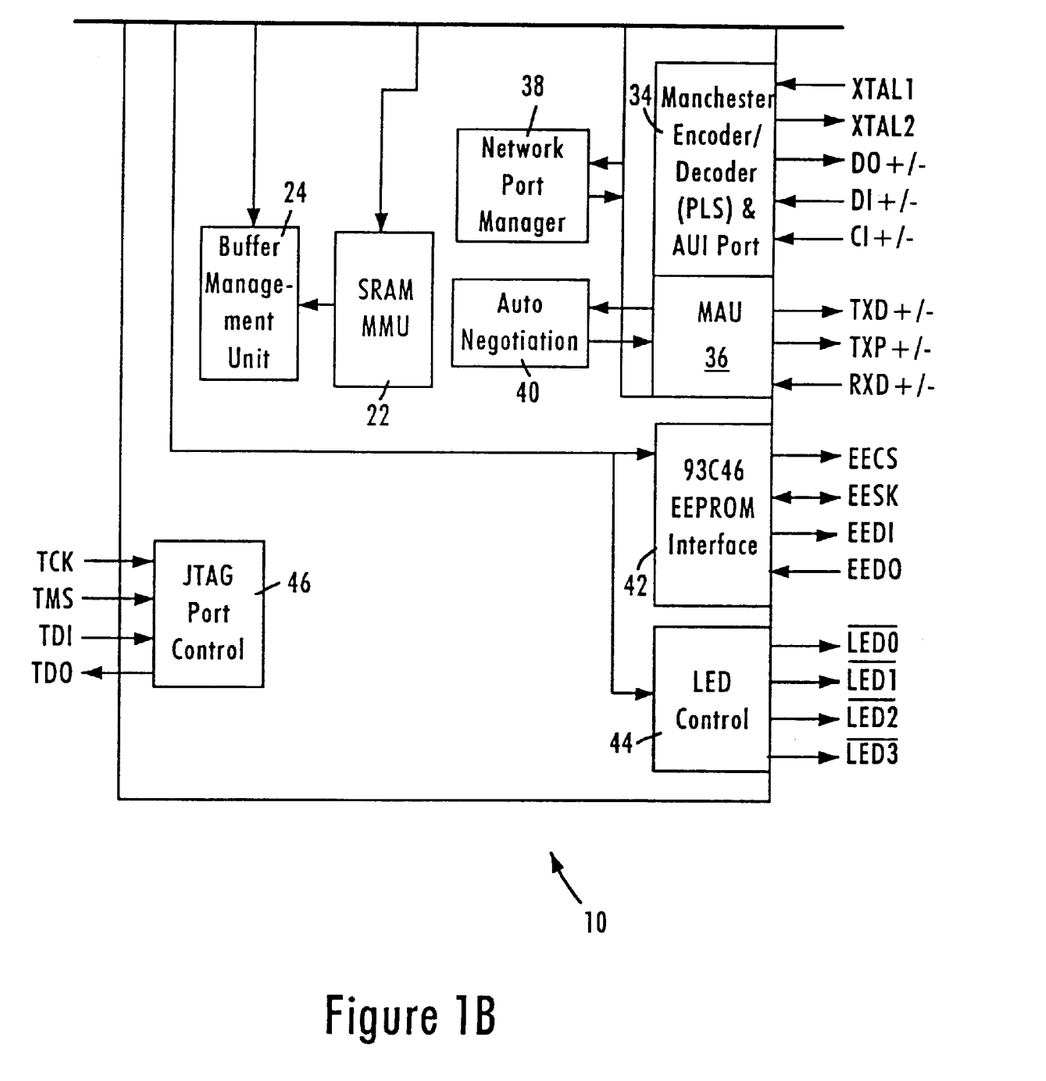

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The network interface device 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1)) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

Memory Management Architecture

Figure 2:
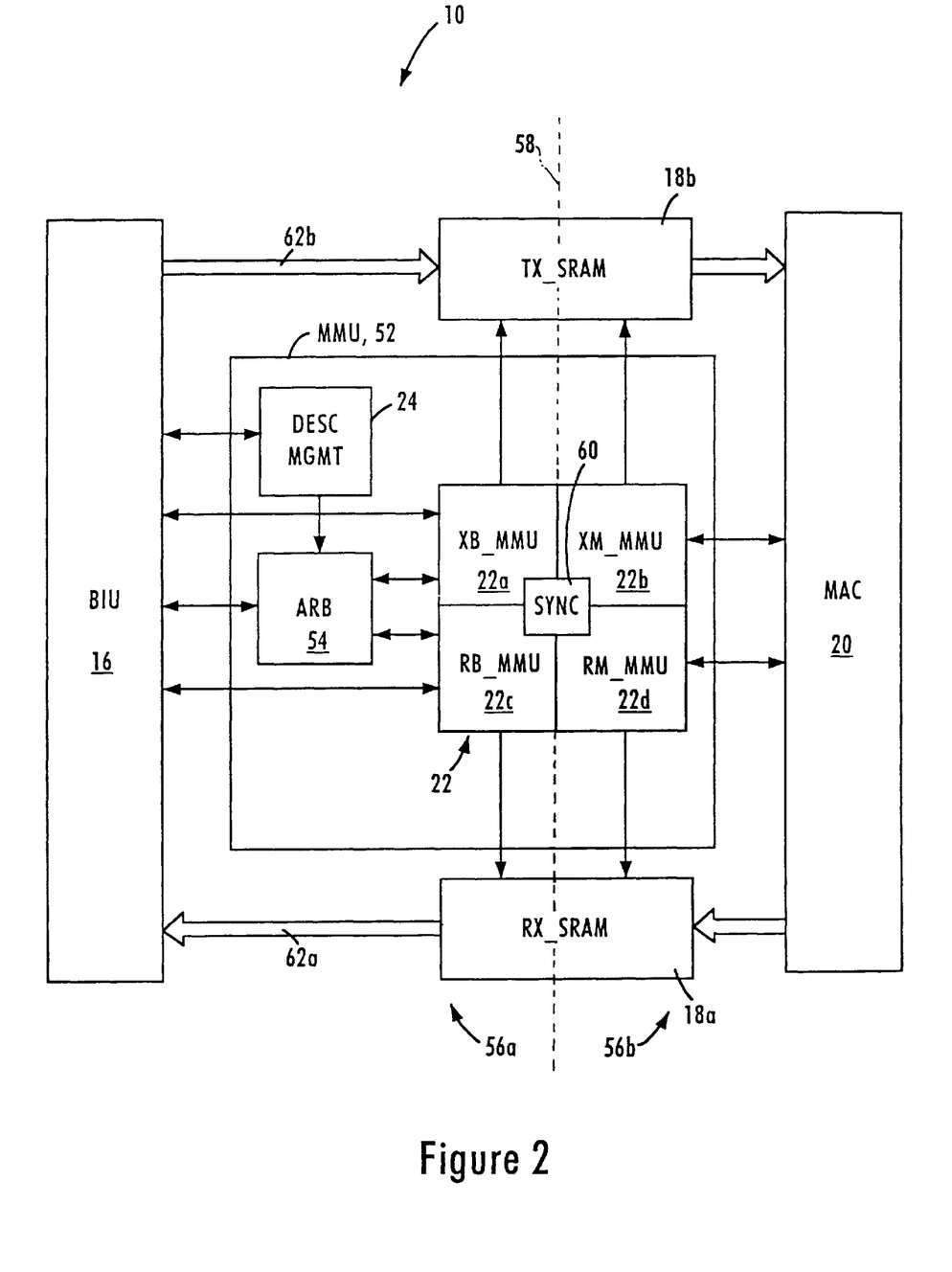
FIG. 2 is a block diagram illustrating in detail the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data busside memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Figure 3:
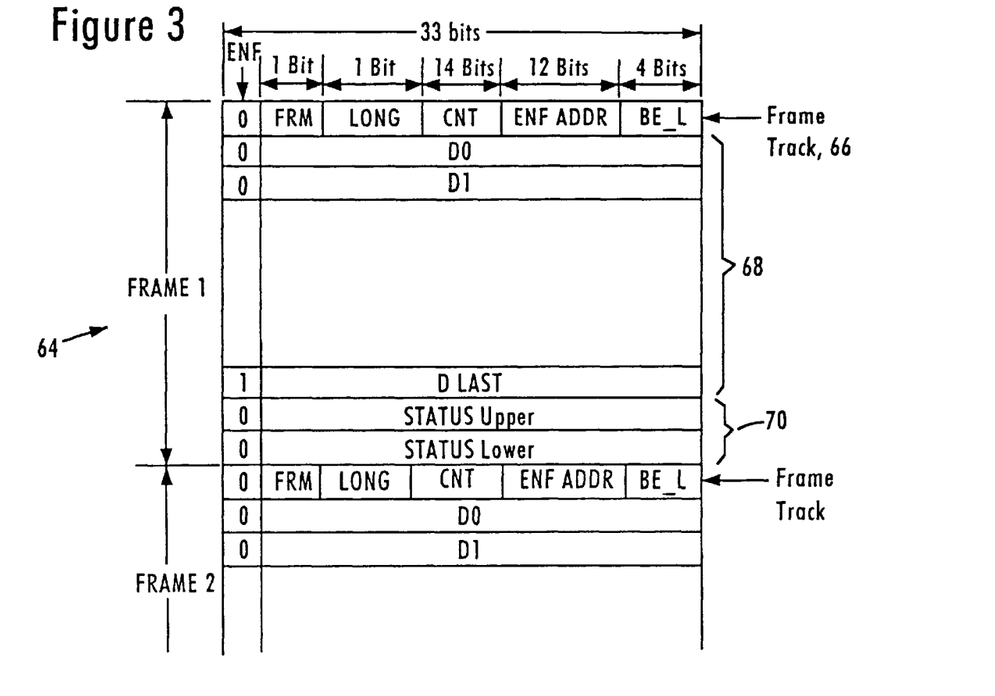
FIG. 3 is a diagram illustrating an exemplary data structure of a data frame stored in the random access memory of FIG. 1.

FIG. 3 is a diagram illustrating a data structure of a receive data unit in the RX_SRAM 18a. A similar structure also may be used for storing data in the TX_SRAM 18b. As shown in FIG. 3, each stored data frame 64 includes a frame track field 66 preceding a group of data bytes representing the frame data 68 (i.e., the packet data to be transmitted by the MAC 20), followed by a control field 70. In this case, the RM_MMU 22d stores frame track information 66 and the control field 70 related to the receive data frame 68. The frame track field 66 is used by the RB_MMU 22c to keep track of the location of the corresponding receive data frame 68 in the RX_SRAM 18a. Hence, the frame track 66 enables the RB_MMU 22c to quickly flush a stored data frame 64 having receive data 68 and jump to the beginning of the next stored data frame (e.g., $64_2$), based on an end of frame address field (ENF ADDR), a count (CNT) field specifying the number of DWORDS (D0, D1, ..., DLAST), and an end of frame (ENF) bit indicating whether the data frame 64 contains valid data ready for reading. The byte enable-last field (BE_L) specifies how many of the bytes in the DLAST field are valid. The long (LONG) field specifies whether the corresponding data frame is determined by the RM_MMU 22d to exceed a prescribed number of bytes, described below.

Figure 5A:
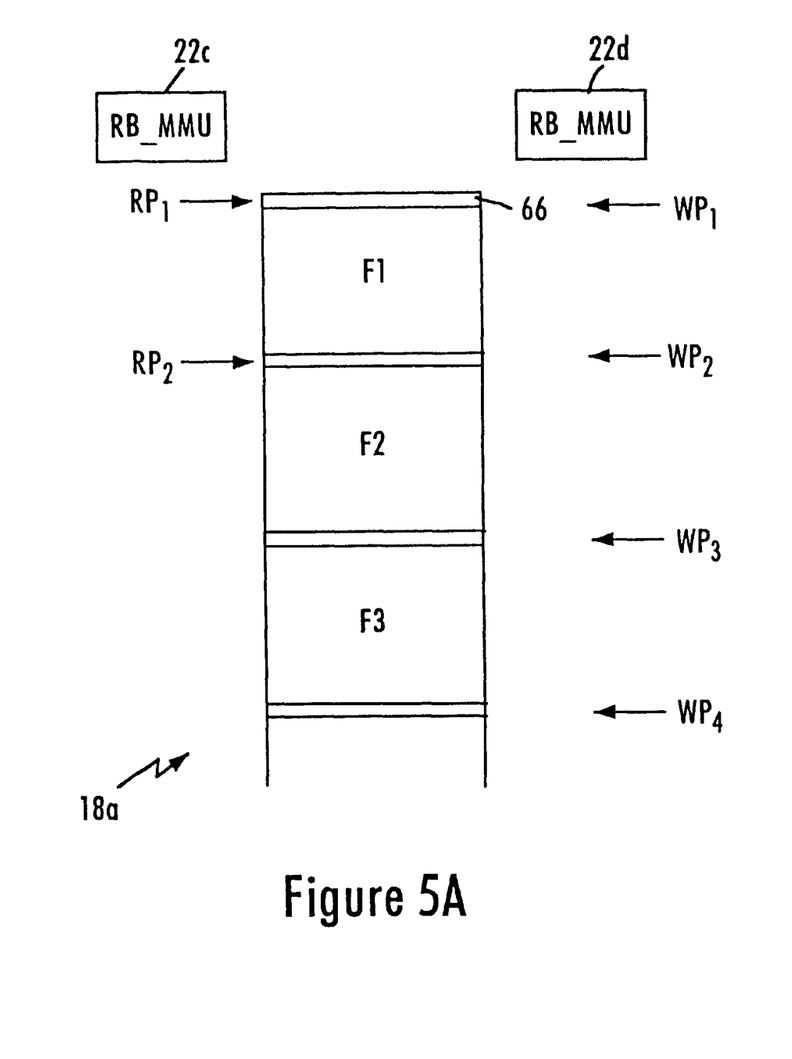
FIGS. 5A and 5B are diagrams illustrating storage conditions when the receive memory of FIG. 2 stores at least one full frame of data and less than one full frame of data, respectively.

FIG. 5A is a diagram illustrating multiple data frames (F1, F2, etc.) stored in the RX_SRAM 18a. Assume that the RM_MMU 22d is writing a sequence of data frames 64 (frame 1, frame 2, etc.) into RX_SRAM 18a using a write pointer (WP), while the read controller 22c is reading out the data frames from the RX_SRAM 18a to the BIU 16 using a read pointer (RP). If the read controller discards (e.g., flushes) a transmit data frame and desires to jump to the beginning of the next data frame, the synchronization circuit 60 must be able to track the start and beginning of each data frame to ensure that the read controller 22c properly locates the beginning of the next data frame.

Figure 5B:
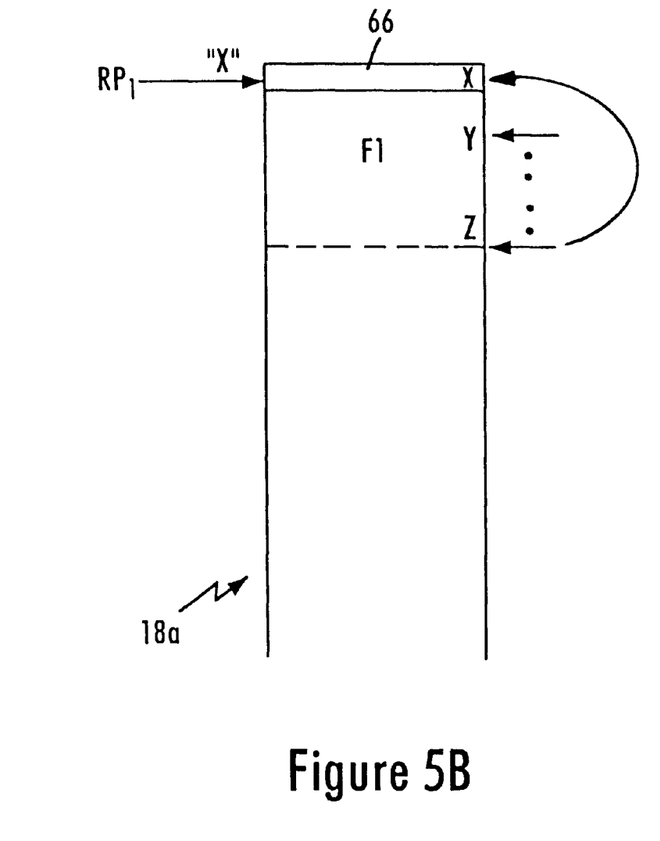

The synchronization circuit 60 includes read and write pointers for each SRAM 18a and 18b in order to enable the corresponding memory management unit to track the location of stored data. Since the writing and reading operations occur in two independent clock domains 56, however, a condition may arise as shown in FIG. 5B where the read and write pointers are about to point to the same memory location RP1.

For example, assume a read pointer value and a write pointer value are stored in binary counters, where a write pointer has a value (WR=100) and a read pointer in the second independent clock domain transitions from (RD=011) to (RD=100). Since the clock domain 56a and 56b operate independently of each other, a logic comparator performing a comparison between the write pointer and read pointer may erroneously conclude that the read and write pointers have different values at a point in time where the read pointer has a transitional value (e.g., 101, 111, or 000) as the read pointer is being updated. Hence, the attempt to perform an asynchronous comparison between the binary read and write pointers may cause an erroneous conclusion that the read and write pointers are not equal, causing the read controller to read invalid data from memory location 64 while the write controller is writing the data without the opportunity of having updated the frame track information 66.

One possible solution for preventing asynchronous comparisons during counter transitions is to provide latched outputs for the counter values. However, such an arrangement would severely degrade the timing performance of the random access memory as a buffer device.

Synchronization Circuit Operation

According to the disclosed embodiment, the synchronization circuit 60 includes a read counter and a write counter for each transmit SRAM 18b and receive SRAM 18a, where each counter is configured for changing a single bit of a counter value in response to a corresponding signal from the associated MMU controller.

Figure 4:
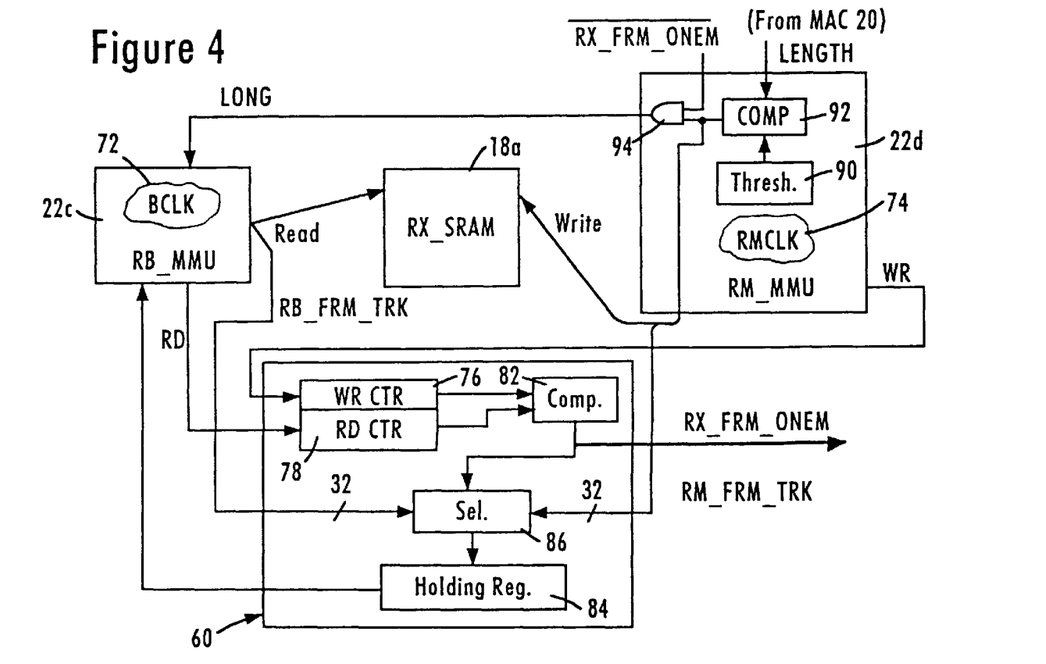
FIG. 4 is a block diagram illustrating in detail the architecture of the memory management unit of FIG. 2.

FIG. 4 is a block diagram illustrating operation of the synchronization circuit 60 with the read and write controllers for the receive SRAM 18a according to an embodiment of the present invention. As shown in FIG. 4, the write controller (RM_MMU) 22d for the receive SRAM 18a is configured for writing a frame (e.g., the data frame 64) into the receive SRAM 18a according to a receive MAC clock (RMCLK) 74 synchronized relative to the network clock domain 56b. The write controller 22d, upon writing an entire data frame 64 into the receive SRAM 18a, outputs a write signal to the synchronization circuit 60 indicating the completed writing of the data frame 64. Specifically, the write controller 22d writes the data frame 64 in FIG. 3 by receiving the frame data 68 from the MAC 20 according to the RMCLK 74. The write controller 22d then reserves a portion (location "X" in FIG. 5B) of the prescribed memory location 64 of the receive SRAM 18a by first writing null data for the frame track 66 to hold header information. The actual frame data 68 is then written (location "Y"), followed by control information 70 (at location "Z"). Following the writing of the control information 70 at location "Z", the write controller 22d then returns to the frame track field 66 at location "X" and updates the frame track with the appropriate header information, including setting the end of frame address (ENF ADDR), updating the count (CNT) field indicating the number of DWORDS in the frame, the frame bit (FRM), and the ENF bit indicating that the memory location 64 stores valid data. The write controller 22d concurrently supplies the frame track information (RM_FRM_TRK) to the synchronization circuit 60 for storage in a holding register 84.

Hence, the write controller 22d outputs the write signal to the synchronization circuit 60 after updating the frame track field 66, at which point the SRAM 18a stores a valid data frame 64 at a prescribed location. As shown in FIG. 5A, successive writing of frames results in outputting a corresponding plurality of frame track values (RM_FRM_TRK) to the holding register 84. Assuming, however, that the read controller 22c attempted to read the first frame F1 from the memory location 64 prior to completion by the write controller 22d, as shown in FIG. 5B, the read controller 22c would obtain invalid data, since the frame track field 66 would not yet be updated with valid data. In addition, the read controller supplies the read frame track information from the accessed memory location (RB_FRM_TRK) to indicate the read status for the holding register 84. Hence, invalid frame track data would be written to the holding register 84 if the read controller attempted a read operation before completion of the corresponding write operation.

According to the disclosed embodiment, the synchronization circuit 60 determines a presence of a complete stored data frame 64 in the random access memory 18a in response to read and write signals and independent of the bus clock 72 and the MAC clock (RMCLK) 74. Specifically, the synchronization circuit 60 includes a write counter 76 configured for changing a single bit of a write counter value in response to the write signal output from the write controller 22d. The synchronization circuit 60 also includes a read counter 78 configured for changing a single bit of a read counter value in response to the read signal from the read controller 22c. As described above, the read controller 22c is configured for reading the frame 64 from the receive SRAM 18a according to a host bus clock (BCLK) 72, where the read controller 22c outputs a read signal to the synchronization circuit 60 in response to the reading of the frame.

According to the disclosed embodiment, the write counter 76 and the read counter 78 are implemented as gray code counters, such that only a single bit of a counter value is changed in response to assertion of the status signal from the corresponding memory controller 22. Use of the gray code counter ensures that any asynchronous comparison between the write counter 76 and the read counter 78 does not result in any erroneous values due to multiple bit transitions that may otherwise occur in counters using binary-format representations.

The gray code counters 76 and 78 output their respective counter values to an asynchronous comparator 82, composed of a plurality of exclusive OR gates. The comparator generates a comparison result indicating the presence of a stored frame based on the first and second counter values, such that the comparator 82 outputs a one or more signal (RX_FRM_ONEM) indicating the presence of at least one stored frame in the receive SRAM 18a if the stored counter values from the write counter 76 and the read counter 78 are unequal.

Storing Frame Track Information

As described above with respect to FIGS. 5A and 5B, the different clock domains 56a and 56b may cause contention problems during the writing of frame track information 66 into the holding register 84, depending on whether there are one or more frames in the memory 18a, as shown in FIG. 5A, or less than one full frame, as shown in FIG. 5B.

The purpose of the holding register 84 is to hold frame track information for the current frame being read from the SRAM. Hence, the synchronization circuit 60 needs to be able to ensure that only valid data is written into the holding register 84 (i.e., frame track data written into the frame track field 66 after having written a complete data frame).

According to the disclosed embodiment, the synchronization circuit 60 includes a selection circuit 86 for selectively storing either the frame track information generated by the write controller (RM_MMU) 22d (e.g., RM_FRM_TRK), or the frame track information generated by the read controller (RB_MMU) 22c (e.g., RB_FRM_TRK). The selection circuit 86 selectively supplies either the first tracking information (RM_FRM_TRK) or the second tracking information (RB_FRM_TRK) to the holding register 84 based on an asynchronous detection of at least one stored data frame in the receive memory 18a. The detection circuit within the synchronization circuit 60, composed of the write counter 76, the read counter 78 and the comparator 82, asynchronously determines the presence of at least one stored frame, and outputs a one-or-more signal (RX_FRM_ONEM) equal to a value of 1 if the SRAM stores at least one or more data frames as shown in FIG. 5A. If the memory 18a stores less than a full frame of data, as shown in FIG. 5B, then the comparator 82 outputs the one-or-more signal as having a value of RX_FRM_ONEM=0. Hence, priority is given to the read controller 22c to write the corresponding frame track information into the holding register 84 if one or more frames are stored in memory 18a as shown in FIG. 5A, and grants priority to the write controller 22d if less than one full frame is stored in memory 18a, as shown in FIG. 5B.

Selectively Supplying Long Bit Data for Host Bus Tansfers

As shown in FIG. 3, the frame track field 66 includes a long field that specifies whether the corresponding receive data frame 68 exceeds a predetermined threshold, for example a prescribed number of bytes. As described below, the read controller (RB_MMU) 22c is configured for assisting the arbitration unit 54 in the initiation of DMA transfers on the PCI bus 12. If the stored data frame 68 is a substantially long frame (e.g., 500–1000 bytes), then a DMA interrupt should be generated based on a different threshold to minimize access latency.

According to the disclosed embodiment, the RM_MMU 22d, which determines the long bit in the frame track 66 for slave transfers, enables the read controller (RB_MMU) 22c to share the long bit information in order to reduce the complexity of the network interface device, for example by minimizing the interconnect or pin count. Hence, the read controller (RB_MMU) 22c can select between one of two stored thresholds based on the long bit, where one stored threshold is optimized for long frames, and another stored threshold is optimized for shorter frames. Although the storage of the long bit into the frame track 66 is sufficient for multiple stored data frames, as shown in FIG. 5A, if less than a complete data frame is stored in the RX_SRAM 18a, as shown in FIG. 5B, latency issues arise if the RB_MMU 22c needs to wait until the frame track field 66 is updated following storage of the completed data frame (F1) before determining from the stored LONG bit that a DMA transfer should have been requested.

According to the disclosed embodiment, the RB_MMU 22c receives long bit information from the RM_MMU 22d based on whether at least one complete data frame is stored in the buffer memory 18a. According to the disclosed embodiment, if the synchronization circuit 60 determines at least one complete data frame is stored in the buffer memory 18a (RX_FRM_ONEM=1), the RB_MMU 22c obtains the long bit information by reading bit 30 of the corresponding frame track field 66. However, if less than one complete data frame is stored in the buffer memory 18a (RX_FRM_ONEM=0), then the RM_MMU 22d directly supplies the long signal to the RB_MMU 22c upon generation by the RM_MMU 22d.

Figure 6:
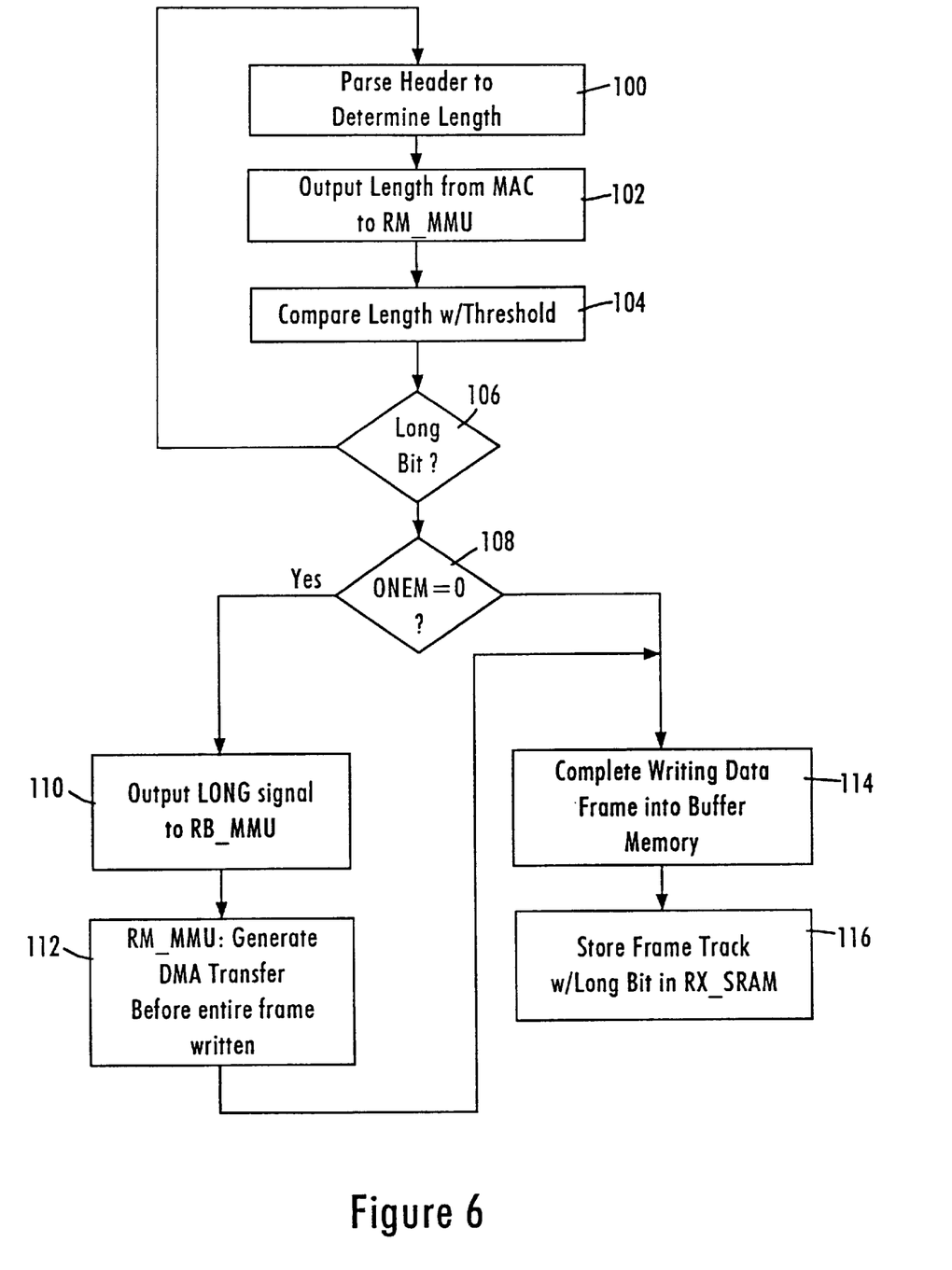
FIG. 6 is a flow diagram illustrating the method for selectively outputting the long bit comparison result to the read controller of FIG. 4 according to an embodiment of the present invention.

FIG. 6 is a flow diagram illustrating the method for selectively supplying the long bit comparison result to the read controller (RB_MMU) 22c from the write controller (RM_MMU) 22d according to an embodiment of the present invention. The method begins in step 100, where the MAC 20 parses a header of an incoming data frame to determine the length of the incoming data frame in step 100. Specifically, IEEE 802.3 specifies that a data frame following a 56 bit preamble and an 8 bit start frame delimiter (SFD) includes 6 bytes of destination address, followed by 6 bytes of source address, followed by 2 bytes of length information. Hence, the MAC 20 parses the length of an incoming data frame before reception of the actual payload data following the length field. The MAC 20 then outputs the parsed length information (LENGTH) to the RM_MMU 22d in step 102. The write controller (RM_MMU) 22d then compares the received length in step 104 with a prescribed threshold, stored for example in a threshold register 90 (see FIG. 4). As shown in FIG. 4, the length information and the threshold value from register 90 are supplied to a comparator 92, which determines in step 106 if the parsed length information exceeds the prescribed threshold. The comparator 92 selectively generates the long bit comparison result as a long signal (LONG=1), based on the determined data frame exceeding the prescribed threshold, and outputs the long bit comparison result to an AND gate 94 and an internal holding register for storing frame track information (not shown).

If in step 108 the RM_MMU 22d determines that the one or more signal (RX_FRM_ONEM) equals zero, indicating a detected absence of at least one complete stored data frame in the buffer memory 18a (see FIG. 5B), then the RM_MMU 22d immediately outputs the long bit signal from AND gate 94 to the read controller (RB_MMU) 22c in step 110. Since the length information is parsed from the beginning of the data frame, the long bit signal can be output in step 110 to the RB_MMU 22c before the complete data frame (F1) is written into the RX_SRAM 18a. Hence, the RB_MMU 22c can receive the long bit information, indicating reception of a long data frame, well before the complete data frame (F1) has been written into the RX_SRAM 18a. Hence, the long bit comparison result will be output to the RB_MMU 22c concurrent with writing frame data into the buffer memory 18a.

In response to reception of the long bit comparison result (LONG) from the write controller 22d, the read controller (RB_MMU) 22c generates a host bus transfer interrupt, for example a DMA transfer request, to the host CPU via the PCI bus 12 (step 112). As discussed above with respect to step 110, the host bus transfer interrupt is generated prior to completion of writing the frame data into the RX_SRAM 18a, minimizing the latency normally encountered with storing a relatively long data frame in the buffer memory 18a. Concurrent with steps 110 and 112, the RM_MMU 22d continues to write the frame data into the buffer memory 18a. Once the entire data frame has been received by the MAC 20 and stored in the RX_SRAM 18a by the RM_MMU 22d in step 114, the RM_MMU 22d compiles all relevant frame track information in the internal holding register, and stores the frame track information (including the long bit) from the internal holding register into the RX_SRAM 18a at the corresponding frame track location 66 in step 116.

According to the disclosed embodiment, long bit information generated in the write controller 22d is supplied immediately to a read controller 22c in response to a detected absence of at least one complete stored data frame in the buffer memory (e.g., RX_FRM_ONEM=0). Hence, the read controller 22c can immediately initiate a DMA transfer request in anticipation of transferring a large data frame, without the necessity of waiting for the RM_MMU 22d to finish transferring the data frame 68 before updating the frame track field 66 with the long bit information. In addition, sharing of the long bit result between the RM_MMU 22d and the RB_MMU 22c enables reduced complexity (e.g., minimal pin count) without causing synchronization issues due to operation of the write controller 22d and the read controller 22c in respective independent clock domains.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network interface device, comprising:
   determining in a media access controller a length of a data frame received from a network;
   selectively generating a long bit comparison result in a first memory controller based on the length of the data frame exceeding a prescribed threshold, the first memory controller configured for storing the data frame into a buffer memory based on a network clock domain; and
   selectively supplying the long bit comparison result to at least one of a second memory controller, configured for reading the data frame from the buffer memory onto a host bus based on a host bus clock domain, and a memory location in the buffer memory reserved for storing status information related to the data frame, based on a detected presence of at least one complete stored data frame in the buffer memory.

2. The method of claim 1, wherein the determining step comprises parsing a header of the data frame to determine the length.

3. The method of claim 1, wherein the selectively generating step comprises:
   receiving the length from the media access controller;
   comparing the received length with the prescribed threshold; and
   generating the long bit comparison result based on the length exceeding the prescribed threshold.

4. The method of claim 3, wherein the selectively supplying step comprises outputting the long bit comparison result to the second memory controller in response to a detected absence of the at least one complete stored data frame in the buffer memory.

5. The method of claim 4, further comprising:
   writing portions of the data frame into respective memory locations of the buffer memory; and
   storing in the reserved buffer memory location the status information following writing the data frame into the buffer memory.

6. The method of claim 5, wherein the outputting step further comprises outputting the long bit comparison result to the second memory controller concurrent with the writing step and prior to the status information storing step.

7. The method of claim 6, further comprising generating a host bus transfer interrupt in the second memory controller prior to the status information storing step in response to reception of the long bit comparison result.

8. The method of claim 1, further comprising:
   writing the data frame into the buffer memory; and
   generating a host bus transfer interrupt in the second memory controller prior to completion of the writing step in response to reception of the long bit comparison result from the first memory controller.

9. The method of claim 1, further comprising asynchronously detecting the presence of the at least one complete stored data frame in the buffer memory based on write and read pointer values in the first and second memory controllers, respectively.

10. The method of claim 1, further comprising selecting by the second memory controller a transfer interrupt threshold based on the long bit comparison result.

11. A network interface device for storing a data frame, comprising:
    a media access controller for receiving the data frame based on a network clock, the media access controller determining a length of the data frame based on a first portion of the data frame;
    a random access memory;
    a read controller configured for reading data from the random access memory onto a host bus based on a host bus clock; and
    a write controller configured for writing the data frame into the random access memory at a prescribed location according to the network clock, the write controller comparing the determined length of the data frame to a prescribed threshold and selectively outputting a corresponding long bit comparison result to at least one of the random access memory and the read controller based on a detected presence of at least one complete stored data frame in the random access memory.

12. The network interface device of claim 11, wherein the read controller is configured for generating a host bus transfer interrupt in response to reception of the long bit comparison result.

13. The network interface device of claim 12, wherein the read controller is configured for generating the host bus transfer prior to storage of the complete data frame in the random access memory in response to the reception of the long bit comparison result.

14. The network interface device of claim 11, further comprising a synchronization circuit comprising an asynchronous frame detector configured for detecting the presence of the at least one stored frame independent of the network clock and the host bus clock.

15. The network interface device of claim 14, wherein the asynchronous frame detector comprises:

a write counter configured for changing a single bit of a write counter value in response to a received write signal from the write controller;

a read counter configured for changing a single bit of a read counter value in response to a received read signal from the read controller; and a comparator for generating a detection signal indicating the presence of the at least one stored frame based on a detected difference between the write counter and the read counter value.

16. The network interface device of claim 15, wherein the write counter outputs the long bit comparison result to the read controller in response to the detection signal indicating the absence of the at least one stored frame.

17. The network interface device of claim 11, wherein the read controller is configured for generating a DMA interrupt on a host bus in response to reception of the long bit comparison result.

18. The method of claim 1, wherein the buffer memory is static random access memory (SRAM).

19. The network interface device of claim 11, wherein the random access memory is a static random access memory (SRAM).

20. The network interface device of claim 11, wherein the media access controller determines the length of the data frame by parsing a first portion of the data frame.

* * * * *